United States Patent [19]

Diener

[11] Patent Number: 5,784,562
[45] Date of Patent: Jul. 21, 1998

[54] SYSTEM FOR USING A DIALOG SESSION CONTEXT TO PROCESS ELECTRONIC FORMS DATA ON THE WORLD WIDE WEB

[75] Inventor: Glendon Diener, Boulder, Colo.

[73] Assignee: U S West Advanced Technologies, Inc., Boulder, Colo.

[21] Appl. No.: 541,388

[22] Filed: Oct. 10, 1995

[51] Int. Cl.$^6$ ........................................ G06F 13/14
[52] U.S. Cl. ................ 395/200.47; 395/200.33; 395/200.57; 395/768
[58] Field of Search ........................ 395/680, 682, 395/685, 200.33, 200.49, 200.57, 200.67, 762, 766, 768, 792, 200.47

[56] References Cited

U.S. PATENT DOCUMENTS

| | | | |
|---|---|---|---|
| 5,235,654 | 8/1993 | Anderson et al. | 395/767 |
| 5,339,392 | 8/1994 | Risberg et al. | 707/501 |
| 5,491,820 | 2/1996 | Belove et al. | 395/200.49 |
| 5,623,656 | 4/1997 | LYons | 395/200.49 |
| 5,664,207 | 9/1997 | Crumpler et al. | 395/200.49 |
| 5,666,490 | 9/1997 | Gillings et al. | 395/792 |

*Primary Examiner*—Eddie P. Chan
*Assistant Examiner*—Gary J. Portka
*Attorney, Agent, or Firm*—Holme, Roberts & Owen

[57] ABSTRACT

An electronic document processing system is disclosed for a communications network, wherein the network protocol has the property of repeatingly breaking down each established communication connection between network nodes attempting to carry on a dialog session. Related document data is exchanged between a network server and a client node, wherein the network communication connection between the server and the client must be repeatedly re-established and the prior dialog session context must be reassociated with continued dialog session communications between the server and client. Accordingly, the server node embeds a dialog session identifier within each communication to the client so that a response from the client may return the identifier thereby allowing the server to associate new client input with previously stored input related to the dialog session. The present invention is useful in maintaining a dialog session on the World Wide Web network wherein the widely used hypertext transfer protocol is the network protocol. Further, the present invention allows the server to customize document templates for responding to a client node communication. For the World Wide Web, the document templates are encoded in an enhanced version of the hypertext mark-up language wherein portions of such templates are capable of being replaced with stored dialog session data for customizing a document (particularly, a fill-out form) to be used for responding to a client.

22 Claims, 6 Drawing Sheets

CALL TARIFF APPLICATION

ENTER YOUR PHONE NUMBER: [          ]

ENTER YOUR 4-DIGIT PIN: [          ]

[SUBMIT]

FIG. 4

HELLO MR. JOHN DOE.
YOUR PHONE NUMBER IS 123 456 7890.
YOU ARE ELIGIBLE FOR THE FOLLOWING DISCOUNTS: FREQUENT CALLER'S PROGRAM.
NOTE: THIS MONTH, HALF PRICE ON ALL OUT-OF-STATE CALLS!

ENTER THE CALLING NUMBER: [          ]

ENTER THE TIME OF THIS CALL: [          ]

ENTER THE DATE OF THIS CALL: [          ]

ENTER THE DURATION OF THIS CALL: [          ]

[SUBMIT]

FIG. 5

HELLO MR. JOHN DOE.
YOUR PHONE NUMBER IS 123 456 7890.
YOU ARE ELIGIBLE FOR THE FOLLOWING DISCOUNTS:
NOTE: THIS MONTH, HALF PRICE ON ALL OUT-OF-STATE CALLS!

ERROR:
YOU FORGOT TO ENTER THE DURATION OF THIS CALL.
PLEASE ENTER AND RESUBMIT.

ENTER THE CALLING NUMBER: | 111 222 3333 |

ENTER THE TIME OF THIS CALL: | 8:30 PM |

ENTER THE DATE OF THIS CALL: | SEPT. 21 |

ENTER THE DURATION OF THIS CALL: | |

[ SUBMIT ]

FIG. 6

THE TARIFF FOR CALLING 111 222 3333 FROM 123 456 7890 ON SEPT. 21 AT 8:30 PM FOR 1 HR. IS

SYSTEM FOR USING A DIALOG SESSION CONTEXT TO PROCESS ELECTRONIC FORMS DATA ON THE WORLD WIDE WEB

FIELD OF THE INVENTION

The present invention relates to an electronic forms processing and communication system for a communications network utilizing a communication protocol that automatically disconnects communicating nodes one or more times during a dialog session; in particular, the present invention relates to forms processing and communication on the World Wide Web using a hypertext transfer protocol.

BACKGROUND OF THE INVENTION

There are numerous methods for transferring information over interconnected networks such as the Internet. In one common scenario, a user having a computer for accessing such interconnected networks activates a browser on his/her computer and interacts with a "server" network node (or simply server node) for obtaining data and/or computational services. Thus, the user's computer assumes the role of a client in a client/server computing model while the server node assumes the role of server (i.e., service provider).

Since such interconnected networks may allow an exceptionally large number of anonymous users to dynamically access such server nodes, some communication protocols used by client browsers and server nodes do not maintain a context that persists over a plurality of communications between a client node and a server node. That is, a client node request to a server node is performed without the server node retaining information regarding previous client node requests. Thus, server node access is idempotent in that repeated requests to the same server node application by the same client will yield the same results. In particular, such idempotent or contextless communication is characteristic of client/server communications on the World Wide Web (WWW) using a common application communication protocol such as the hypertext transfer protocol (HTTP).

In certain network communications, however, it is desirable to maintain a context throughout a series of discrete network communications between a client node and a server node even though the communication protocol used does not support maintaining such a context. That is, it is desirable to have repeated communication exchanges between a client and server network nodes wherein information from one or more previous communications is retained for use in processing a subsequent communication between the client and server.

SUMMARY OF THE INVENTION

The present invention is a processing system and method for electronic fill-out forms, wherein forms information is repeatedly exchanged between two nodes on a communications network. More particularly, the present invention allows an application on a network server node and a network browser on a client node of the communications network to repeatedly exchange information, such as fill-out forms information, wherein a continuity in the context of the dialog between these network nodes is maintained by the application on the server node even though the network communications protocol may not provide a sustained network connection between the client and the server node (i.e., the protocol breaks down or disconnects an established communication channel between the client and server node). Furthermore, the present invention provides such a dialog context by utilizing the capabilities of standard network browsers already residing on client nodes, wherein graphics, hypertext and electronic fill-out forms may be provided in a standard fashion through these browsers.

The present invention includes a hardware/software configuration on a network server node for storing and associating information related to fill-out forms input received from a client node so that this information may provide a context for the processing of subsequent forms information between the server and client node. The forms processor of the present invention establishes and maintains a client context at the server node by: (a) creating an identifier for uniquely identifying communications between the client and server node that belong to a particular "dialog session" of iterative fill-out form (or more generally, document) information exchanges, and (b) embedding this identifier within a data structure compatible with the network protocol so that the data structure can be provided in communications from the server node to the client node and, additionally, automatically returned with each client node response that is part of the dialog session. In conjunction with the above described identifier (hereinafter also known as a session identifier), the server node maintains a data base of information (hereinafter also known as the user context data base) accumulated regarding currently active dialog sessions with network clients or users. In particular, for each dialog session with a user (at a client node), the accumulated information related to user responses received at the server node is stored in the user context data base so that it is accessible via the session identifier for the dialog session.

In providing a document processing dialog session, the present invention may access a plurality of stored document templates, such as fill-out form templates, for selecting an appropriate such template and customizing the selected template with user specific information, for example, from the user context data base. Subsequently, such customized templates may be transferred to the user as a continuation of the dialog session.

A networking environment for the present invention is the World Wide Web (WWW), wherein a communications application protocol that is widely used is the hypertext transfer protocol (HTTP), this protocol having the property of terminating client-server node network connections after every server response to a client request. For this environment, it is an aspect of the present invention that the above mentioned session identifier is exchanged between the client and server node using a HTTP compatible format of (name,value) pairs wherein an identifier, "name", is associated with a value, "value", for exchanging information between WWW clients and servers as one skilled in the art will appreciate and as will be described further in the detailed description hereinafter. Additionally, it is a further aspect of the present invention to also use a representation of the (name,value) pairs for storing a dialog session context in the user context data base and for subsequently selecting and customizing a selected document template (from the stored plurality of such templates) so that a resulting new document form may be transferred to a client node as a response to a communication from the client node.

Note that it is a further aspect of the present invention that in the WWW environment, the document templates are encoded in an enhanced or specialized variation of the widely used hypertext mark up language (HTML). In particular, the specialized HTML includes "replace" instructions wherein each replace instruction, when performed, is replaced by a character string yielding a non-specialized or conventional HTML statement. Further, such replacement character strings are determined by examining the dialog session context in the user context data base. Accordingly, the resulting customized documents are encoded in HTML with no enhancements or specializations, and therefore, when transferred to a client node, can be readily interpreted by most WWW client node browsers as one skilled in the art will appreciate.

It is a further aspect of the present invention to provide a programmatic pattern or template for constructing server node document processing applications for constructing customized documents (e.g., fill-out forms) as described above. In particular, the present invention provides one such programmatic template for the WWW network environment. Thus, by incorporating into the programmatic template the steps for performing the semantics of a particular document processing application, a document processing program may be easily constructed that outputs documents compatible with both HTTP and HTML. Accordingly, when executed, such a program, upon receiving (name,value) pairs from a user communication, identifies the dialog session to which the (name,value) pairs correspond, updates the context information for this dialog session (in the user context data base) according to the particular document processing application being performed, then determines a document template to customize using the stored dialog session context, and subsequently customizes the determined document template and transmits it to the user's client node.

Thus, the present invention is particularly advantageous in that each user at a WWW client node, having a conventional WWW browser, may repeatedly interact with an application utilizing the present invention such that a context for successive interactions is accumulated. That is, each user may be supplied with additional information or granted access to additional services depending on the user's input received by the application in previous network communications. Accordingly, the application may use such a context to automatically tailor documents for responding to the user. Therefore, the present invention may be particularly useful in commercializing the WWW wherein business transactions requiring a user to supply various context related types of information may be conducted substantially automatically. Thus, for example, the user may be presented with electronic fill-out forms customized to the user's needs for insurance services, credit services, telecommunication services, etc. Further, note that such context sensitive network communications are also particularly useful for network server node applications where a model of a user must be created or accessed such as in many training or teaching applications.

Other features and benefits of the present invention will become apparent from the detailed description with the accompanying figures hereinafter.

BRIEF DESCRIPTION OF THE DRAWINGS

FIGS. 4–7 are successive illustrations of fill-out form displays on a client node 32 as an example illustrating the operation of the present invention.

DETAILED DESCRIPTION

Figure 1A:
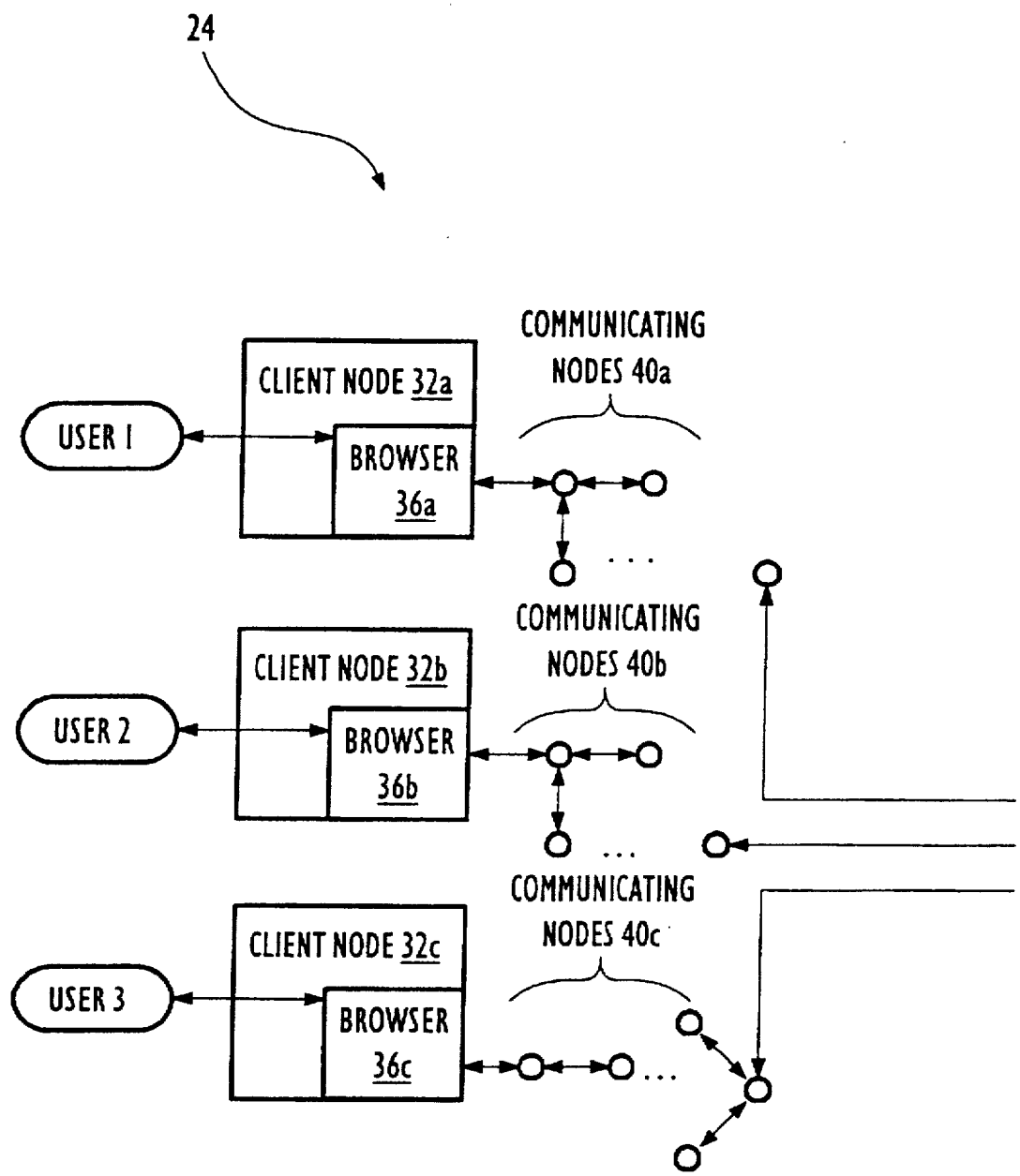
FIGS. 1A and 1B present a high level block diagram of the fill-out forms processing system of the present invention.
Figure 1B:
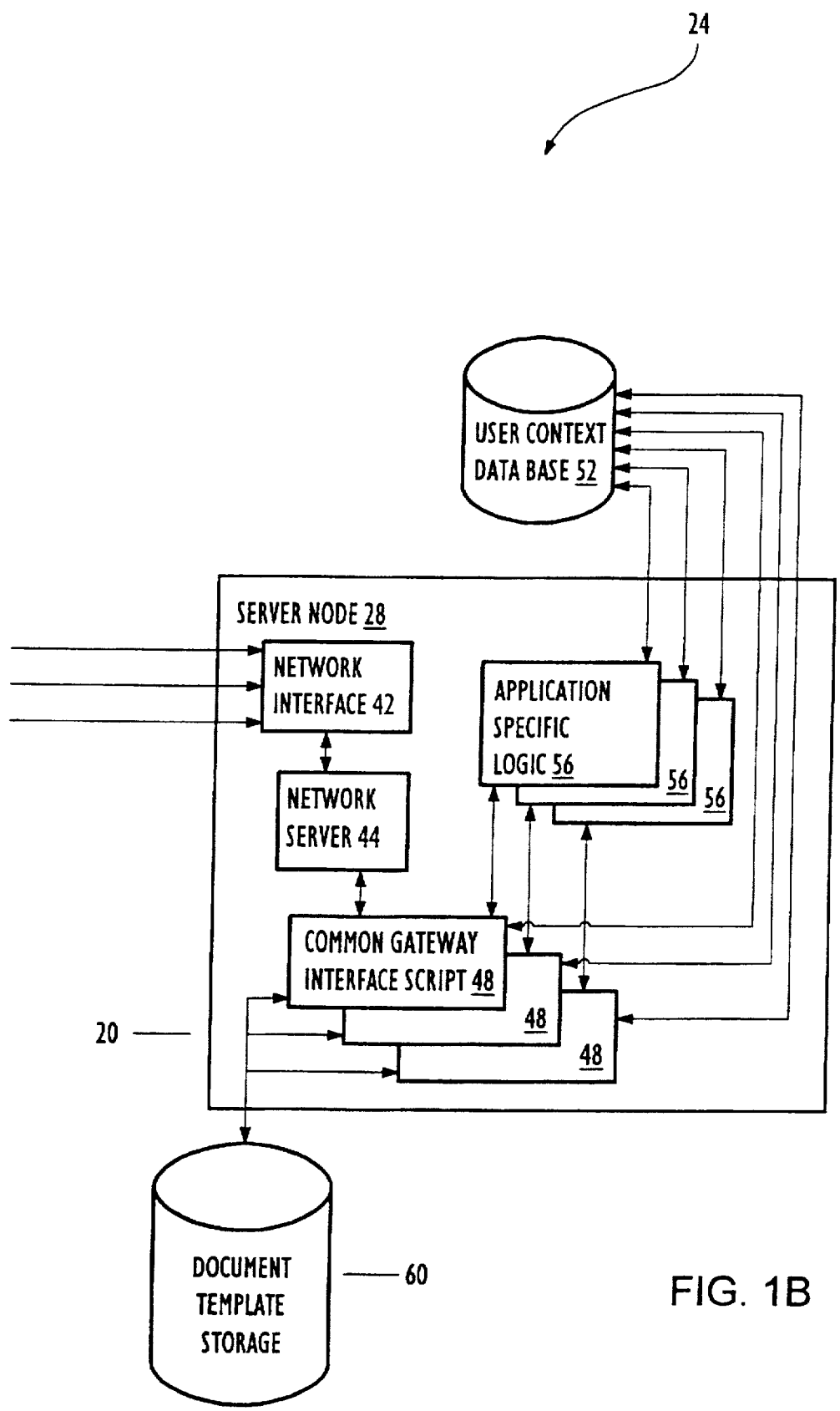

FIGS. 1A and 1B represent a high level configuration of the network document processing system 20 of the present invention for customizing documents presented to a user according to user context information gathered and stored by the present invention during a dialog session with the user. Further, FIGS. 1A and 1B illustrate the present invention within a network environment 24 (such as, in one embodiment, the WWW), wherein a number of users have access to the server node 28 upon which much of the document processing system 20 executes. For illustration purposes only, note that three users are represented in FIG. 1A, each such user interacting with the present invention substantially identically although the sub-networks and communicating intermediate nodes 40a–40c used may be different. Thus, using interactions related to user 1 as illustrative in describing FIGS. 1A and 1B, user 1 interacts with client node (e.g., personal computer) 32a to communicate with the present invention. In particular, user 1 activates a network browser 36a on client node 32a for communicating with other nodes in the network environment 24 such as communicating nodes 40a (which may themselves include a sub-network in which the client node 32a is included). Using some of the nodes 40a as communication pass-through nodes, user 1 may obtain access to server node 28 and, more particularly, to network server 44 which interprets network requests and controls the fulfillment of the requests. The network server 44, in turn, may activate document processing programs including WWW common gateway interface scripts (CGI) 48, three such CGI scripts being illustrated in FIG. 1B. Note that the CGI scripts 48 are enhanced or "specialized" CGI scripts in that they include executable statements not provided in typical WWW CGI scripts, such statements being desirable in the embodiment of the invention as will be discussed below.

Upon activation, each such CGI script 48 communicates with the user context data base 52 of the present invention for storing, in a user specific area, newly received user information provided from user input, for example, one of the electronic fill-out form documents displayed on the user's browser (e.g., browser 36a). Further, each activated CGI script 48 may cause application specific document processing to be performed, each programmatic encoding of such processing being denoted by application specific logic 56. In particular, each application specific logic 56 may be used for examining and/or modifying user information in the user context data base 52. Additionally, each activated specialized CGI script 48 may retrieve a generic electronic document template from the document template storage 60 and subsequently customize or particularize the retrieved document template according to information in the user's specific area of the user context data base 52.

I. The Present Invention and the World Wide Web

In one embodiment, the present invention is directed to context preserving electronic document based communications of the World Wide Web. Accordingly, a brief discussion of the World Wide Web (WWW) as it relates to the present invention follows.

The WWW adopts a client/server model for distributed computing. That is, two independent processing units or nodes, one referred to as a client and the other referred to as a server, communicate with one another wherein the client commences the communication by sending a request to the server. Subsequently, the server determines how to respond to the request. Further, once a response to the request is received by the client, there will be no further communication between the client and server until the client sends another server request. In particular, a plurality of network nodes 32, each having a WWW browser (e.g., browsers 36), are considered clients and they make requests to a server node 28 for various services and, subsequently, the server node 28 determines how to respond to such requests. As one skilled in the art will understand, such client requests on the WWW may be communicated in the hypertext transfer protocol (HTTP), which is a protocol layered on top of the Transmission Control Protocol/Internet Protocol (TCP/IP). Typically, an HTTP request from a WWW client node asks a WWW server node to return a document formatted in a format known as the hypertext markup language (HTML). Upon receiving a return response from the WWW server node, a WWW browser on the WWW client node subsequently interprets and visually displays the requested document to a user (e.g., user 1).

Note that the HTTP is stateless, i.e., a WWW server node may not maintain any information regarding a WWW client after an HTTP request has been satisfied. Furthermore, the HTTP is a protocol for establishing only short-lived communication connections between WWW client and server nodes. That is, upon submittal of a HTTP request by a client node for information from a server node, the underlying network connection protocol, such as TCP/IP, establishes a communication connection between the WWW client and the server node. However, once this single request is satisfied (i.e., the server node detects that the requested information has been transmitted to the client), the server initiates a breaking or disconnecting of the communication connection in accordance with the HTTP protocol. Thus, to establish a dialog session having a series of communications from the WWW client node to the WWW server node interleaved with a series of responses from the WWW server node to the WWW client node where there is a continuity of context throughout the dialog session, some additional context preserving capability must be provided.

Each HTML document transferred on the WWW consists of a sequence of WWW browser displayable characters interspersed with specially-formatted strings called "HTML tags." Many HTML tags are directives used by WWW browsers to determine some aspect of a document's visual display, such as font size, line break location, etc. To illustrate, in the following HTML fragment, the HTML tags are the strings "<b>" and "</b>":

This is <b>bold</b> text.

As this illustration shows, many HTML tags come in pairs, effecting the appearance of all text falling between each tag of the pair. Note that the exact appearance of the text is browser-dependent. However, when displayed by a typical WWW browser, the HTML fragment above might appear something like this:

This is bold text.

HTML documents may contain "hyperlinks." A hyperlink is an HTML tag in a document which, when activated through user interaction, typically causes a WWW browser to issue a request to some WWW server node for retrieval and delivery of some additional document. Thus, a hyperlink typically includes a specification, known as a "universal resource locator", defining how a client node is to communicate with a server node. In particular, a universal resource locator includes: a specification of the network protocol to be used, the WWW server node's network address, and the particular document to be retrieved. For example, the following HTML fragment includes a hyperlink:

<a href="http://www.someserver.com/someDocument.html"> Click here</a> to see another document.

That is, the hyperlink extends from the beginning of this HTML fragment to (and including) the "</a>". Further, in the preceding HTMS fragment, the URL is the string "http://www.someserver.com/someDocument.html".

Note that the above HTML fragment may be displayed on a WWW browser as:

Click here to see another document. [1.1]

A hyperlink is normally activated by user interaction such as mouse-clicking on the hyperlink visual display in a WWW browser. To illustrate, referring to [1.1] above, when the user mouse-clicks on the string "Click here", the WWW browser interprets this as a request to use the HTTP protocol to request the document called "someDocument.html" from the WWW server whose internet address is "www.someserver.com".

Further note that CGI scripts 48 in a WWW environment are programs that may be identified by URLs in user WWW server requests (such as hyperlinks). Such CGI scripts 48 are executed by WWW server nodes in response to requests from WWW browsers. When executed, a CGI script is responsible for generating a document which the executing WWW server will subsequently return to the requesting browser. CGI scripts, then, provide a mechanism whereby a WWW server node may deliver a dynamic, programmatically-generated document, as opposed to delivering a pre-existing, static document, to a requesting WWW client node.

Additionally, an HTML document may contain HTML tags for defining one or more fill-out forms wherein, when visually displayed to a user by a WWW browser, each such fill-out form appears as a region of a document containing graphical widgets such as text entry fields, buttons, scrolling lists, etc. Note that HTML tags defining named graphical widgets can be nested within the scope of a fill-out form HTML tag, as one skilled in the art will appreciate. As an example, the following HTML fragment specifies a fill-out form defining two graphical widgets, the first of which is named: "userName".

<form action="http://www.someserver.com/someCGIScript" method=POST>
Please enter your name: <input type=text name=userName>
<input type=submit>
</form> [1.2]

Figure 2:
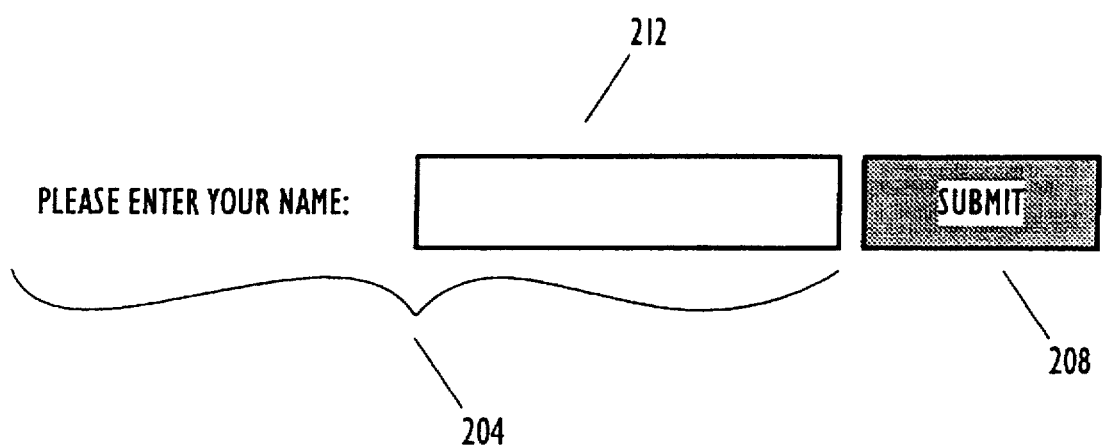
FIG. 2 illustrates a simple fill-out form as it might appear on a browser 36.

When displayed by a WWW browser, the fragment [1.2] may appear as in FIG. 2. Note that in this HTML fragment, the second line provides for the display of graphical widget 204, while the third line provides for the display of graphical widget 208. Further, note that the first line of the HTML fragment is an instruction for activating "someCGIScript" with the user input supplied in text box 212 when the user mouse-clicks on the widget 208.

Note that every fill-out form is associated with a URL identifying a CGI script (e.g., a specialized CGI 48) to process the user information supplied in the form. In particular, such a URL may be associated with a "submit" button such as widget 208. Further note that when a user activates such a submit button, any values entered into the fill-out form's named graphical widgets are encoded by the WWW browser as a series of one or more (name,value) pairs, then transmitted to the WWW server node identified by the fill-out form's associated URL. When that WWW server node subsequently executes the indicated CGI script, these (name,value) pairs are made available to the script as input data. Referring to the previous HTML fragment [1.2] and FIG. 2, if the user types the string "Mary Smith" into the text box 212 and activates the submit button, the WWW browser will send an HTTP request to the WWW server node at the address "www.someserver.com", requesting the server to execute the CGI script 48 identified as "someCGIScript", and providing it with the (name,value) pair: (userName,Mary Smith) which is alternatively denoted as "userName=Mary Smith".

It is important to note that for the present invention, in the environment of the WWW, each document template in the document template storage 56 is represented in an extended version of HTML. In particular, the HTML extensions may include specialized HTML tags. In the present invention, such a specialized HTML tag is treated by a specialized CGI script 48 as an instruction to perform the following: (a) interrogate the user context data base 52 and retrieve the "value" field of a (name,value) pair, and (b) replace or rewrite the specialized HTML tag with the retrieved value. More precisely, since such a specialized HTML tag includes a "name" identifier (e.g., name1), upon execution of the tag, a value (e.g., value1) results wherein the pair (name1, value1) occurs in the user specific area for the user whose WWW server request caused the specialized HTML tag to be processed. Subsequently, the resulting value (e.g., value1) replaces the specialized HTML tag in the document template. However, if no corresponding (name,value) pair is found in the user specific area of the user context data base 52, then the specialized HTML tag is simply replaced or rewritten within the document template with the empty string.

To illustrate the processing of a specialized HTML tag, suppose a document template being processed by a specialized CGI script 48 contains the following fragment:

Hello <replace name="customerName">.

wherein the "<replace name="customerName">" is a specialized HTML tag. Further, suppose the user context data base 52 contains the (name,value) pair (customerName,John Doe) in the user specific area (of the user context database 52) for the user who requested activation of the CGI script 48. After rewriting, the preceding fragment becomes:

Hello John Doe.

In this case, the specialized HTML tag has the form <replace name=". . . ">. Note that other types of specialized HTML tag processing are also contemplated. In particular, the types of specialized HTML tags and the processing they receive by specialized CGI scripts 48 is completely application dependent. Three examples of other possible specialized HTML tags and the processing they may receive follow:

(i) <replace name="someName" value="someValue" text="someText">

Look up the name "someName" in the user context data base 52. If a (name,value) pair having "someName" as the name is found in the appropriate user specific area, and if the value component of the (name,value) pair is "someValue", then replace the specialized HTML tag (in the form template being processed) by "someText"; otherwise, replace the tag by the empty string.

(ii) <replace name!="someName" text="someText">

Look up the name "someName" in the user context data base 52. If a (name,value) pair having "someName" as the name is not found, then replace the specialized HTML tag by "someText"; otherwise, replace the tag by the empty string.

(iii) <replace name=="aRegExp">

Replace this specialized HTML tag by the value of the first (name,value) pair found in the user specific area of user context data base 52 wherein the value component matches the regular expression "aRegExp". If no match is found, then replace the specialized HTML tag by the empty string.

II. Specialized CGI Script 48 Processing

Figure 3:
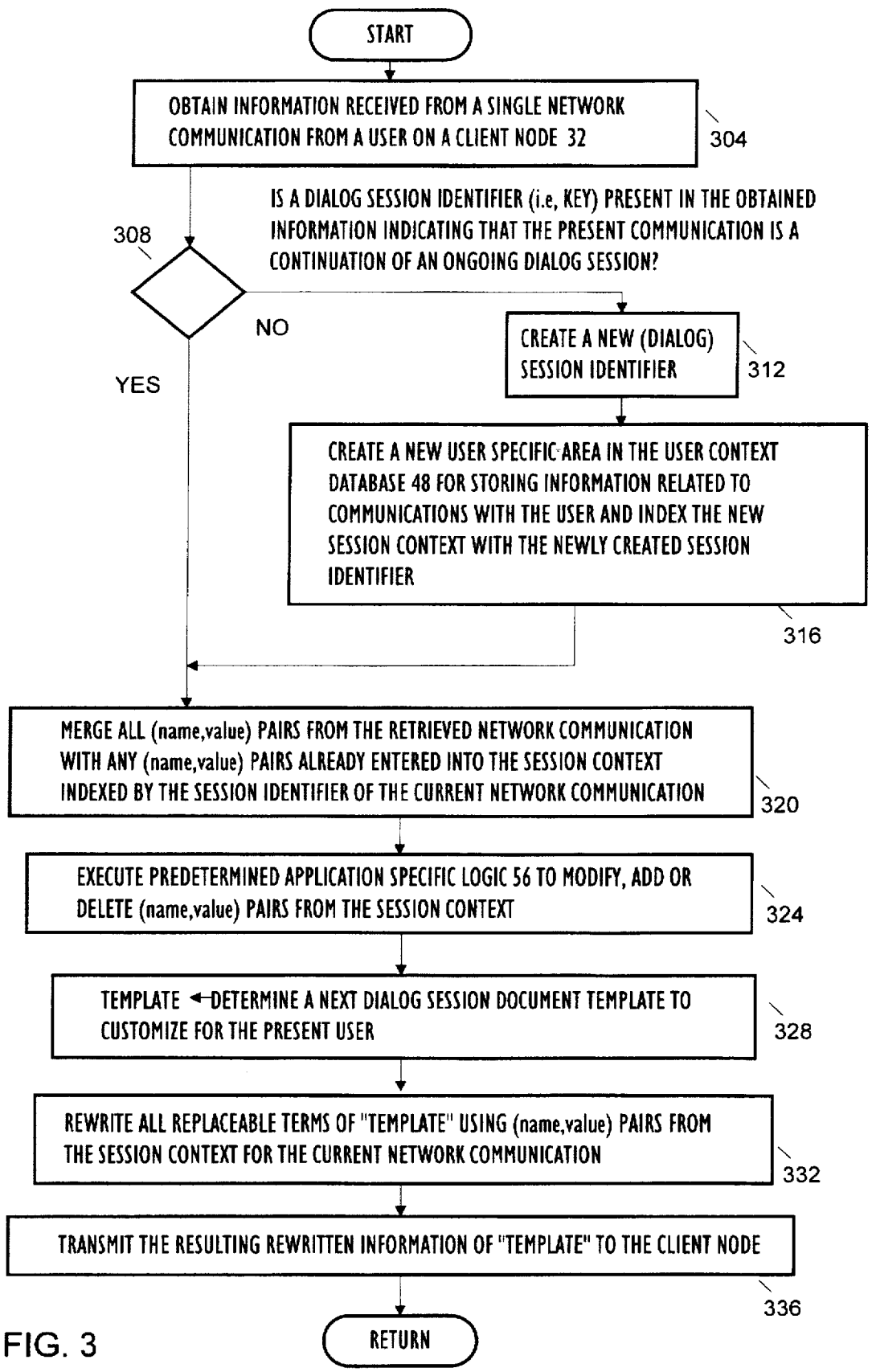
FIG. 3 is a flowchart of the steps performed when an enhanced common gateway interface script 48 of the present invention is activated subsequently to the server node 28 receiving new document related information from a client node 32.

Referring now to FIG. 3, a high level flowchart is provided giving the steps performed by the document processing system 20 at the server node 28 when one of the specialized CGI scripts 48 is activated by a request from a browser 36. It is important to note that the flowchart of FIG. 3 may be considered a pattern for all document processing CGI scripts 48 for the present invention. Thus, additional specialized CGI scripts 48 may be easily provided by utilizing FIG. 3 as a pattern.

It is also important to note that an activation of the flowchart of FIG. 3 may be only one of a series of activations by a single user wherein substantially every activation is linked to previous activations of the series in a manner allowing user supplied information (e.g., fill-out form related information) from earlier activations to be used in subsequent activations. To link such a series, hereinafter also denoted as a "dialog session", a "session identifier" or key is transferred back and forth between the user's browser and the specialized CGI script(s) 48 sequentially activated during a dialog session.

Furthermore, to provide continuity with the description in Section I above, user supplied information used in FIG. 3 (i.e., a specialized CGI script 48) is understood to be a collection of (name,value) pairs as described above.

Accordingly, assuming a specialized CGI script 48 represented by the flowchart of FIG. 3 is activated, then in step 304 a collection of one or more (name,value) pairs is obtained as input from a user. This collection of pairs is supplied by the network server 44. Subsequently, in step 308 a determination is made as to whether the input information includes a session identifier for a dialog session between the user (at a client node) and the document processing application of which the present activation of FIG. 3 is a part. If not, then in step 312 a new session identifier is created and in step 316 this new session identifier is designated as the index for a new user specific area in the user context data base 52, wherein user supplied information for the dialog session is to be accumulated to provide a context for successive responses to user communications. In particular, the user supplied information obtained in step 304 is stored in the newly created user specific area as (name,value) pairs. Further, each network communication from this user, having the session identifier, will also be used in updating (name, value) pairs in this user specific area. Accordingly, for notational convenience only, such stored dialog session information in a user specific area of the user context data base 52 will be referred to hereinafter as the "session context".

Alternatively, if in step 308 a session identifier is found, then the current specialized CGI script 48 activation is part of an ongoing dialog session and the steps 312 and 316 have been performed in a previous activation for the dialog session.

Regardless of the control branch taken from step 308, step 320 is eventually encountered wherein all newly received (name,value) pairs are merged into the context session indexed by the session identifier of the input received by the current network communication. Note that, in general, the merge operation of this step adds each new (name,value) pair to any previously accumulated pairs for the current session identifier. More precisely, if the "name" component of a new pair is not found in any (name,value) pair previously accumulated, then the new pair is added; otherwise, the new (name,value) pair is substituted for the previously accumulated pair having the same name component. Subsequently, in step 324 a predetermined application specific logic 56 is performed for examining the (name,value) pairs indexed by the current session identifier. In particular, such application specific logic 56 may insert, modify and/or delete (name,value) pairs in the current session context. In doing so, note that each application specific logic 56 includes a programmatic encoding of the semantics for processing document information for the particular application associated with the present dialog session.

Subsequently, in step 328 a new document template (referenced by the variable "TEMPLATE") is determined from the document template storage 60 for customizing and sending to the user. In an embodiment, as will be illustrated in an example below, the determination of the new document template is accomplished by using the "value" component of a predetermined (name,value) pair in the session context. In particular, the value component of this pair includes a list of one or more document templates, one of which is to be accessed as the next document template to process in the dialog session. Note that the determination made in this step may also be specific to the particular processing application for the dialog session. For example, there may be a document template on such a list for each of a number of possible session contexts including at least one document template for informing the user of the dialog session that an error has been detected in the input information.

Subsequently, in step 332 all replaceable term or tags in the document template, TEMPLATE, are replaced by components of (name,value) pairs in the current session context. Thus, in the environment of the WWW, where TEMPLATE is specified in an extension of HTML having the specialized HTML tags described previously, the specialized HTML tags of TEMPLATE are replaced resulting in an HTML document to be transferred back to the dialog session user as step 336 indicates.

III. An Example Application

The present invention may be utilized in an application whereby a customer of a long distance telephony carrier uses a WWW browser to interact with that carrier's WWW site to determine the tariff pertaining to a long distance call originating from the customer's residential line at some point in time and of some duration, with due consideration of any applicable discounts or surcharges applicable to that customer. The application presents a series of dynamically-generated HTML documents to the customer, logically linked together to form a single dialog session.

Note that in referring to FIGS. 1A and 1B, the present application requires the server node 24 to have access: (a) to an additional data base of long distance tariff rates and customer account information; (b) to some number of specialized CGI scripts 48 designed for the present application; and (c) to some number of specialized form templates contained in the form template storage 60 designed for the present application.

For initial contact, the customer contacts the carrier's WWW site (e.g., server node 28) by specifying to a browser 36 the site's associated URL. The browser 36 uses the URL to form a network connection to the WWW site. The WWW site responds by transmitting to the browser 36 an HTML document containing a fill-out form presenting fields for the customer to provide identification information such as customer phone number, personal identification number (PIN), or any other information needed to authenticate the identity of the customer. The text for such a fill-out form is given below (note: this and all subsequent example fill-out forms or documents do not represent complete HTML documents; details of HTML having nothing to do with the present invention have been omitted for clarity):
<h2>Call tariff Application</h2>
<form action="http://someserver/tariffApplication">
Enter your phone number: <input name=phone__number>
   <br>
Enter your 4-digit PIN: <input name=PIN > <br>
<input type=hidden name=next__file value=getInfo.html>
<input type=submit>
</form> [3.1]

The resulting screen displayed to the customer is shown in FIG. 4.

Subsequently, the customer may enter the requisite form information and submit the form to the WWW server node identified by "someserver" thereby causing the WWW server (e.g., network server 44) to execute the specialized CGI script 48 identified as "tariffApplication". Further, in executing the tariffApplication specialized CGI script, this script receives input data from the WWW server consisting of (name,value) pairs corresponding to the form data (step 304 of FIG. 3).

The tariffApplication CGI script may now execute the remaining steps of FIG. 3. Thus, in step 308, a scan of the input data is performed for a session identifier. Since no session identifier is present, the script generates a new, unique session identifier (step 312). Subsequently, in step 316 a new user specific area in the user context data base 52 is created, and the session identifier itself is inserted into the customer's newly created user specific area in the user context data base 52.

Following this (step 320), the (name,value) pairs corresponding to the received form data are entered into the customer's user specific area, indexed by the new session identifier. At this point, assuming the customer entered a phone number of "123 456 7890" and a PIN of "1234", and assuming the session identifier is "1A3", the customer's user specific area may be represented as follows:
Session 1A3:
(phone__number, 123 456 7890)
(PIN, 1234)
(next__file, getinfo.html)
(session__key, 1A3) [3.2]

Subsequently, the specialized CGI script, in step 324, executes a predetermined application specific logic 56 wherein the customer account data base is queried using the customer's phone number and PIN. If the customer's identity is successfully established, additional information such as the customer's name and any discount or surcharge information associated with this customer is obtained from the customer account data base. This information is converted into (name,value) pairs and merged into the customer's user specific area. Next, the tariffApplication CGI script inserts an extra (name,value) pair into the customer's user specific area to advise the customer of this month's specials. At this point, the customer's user specific area may be represented as follows:
Session 1A3:
(phone__number, 123 456 7890)
(PIN, 1234)
(next__file, getInfo.html)
(session__key, 1A3)
(customer__name, Mr. John Doe)
(discount, Frequent Caller's Program)
(specials, Note: This month, half price on all out-of-state calls! <br>) [3.3]

Next, in step 328, a determination is made as to the next document template, from the document template storage 60, to process. Since the customer's user specific area (e.g., as in [3.3]) contains the entry (next_file . getInfo.html), the document template identified by getinfo.html is chosen. Assume this document contains the following specialized HTML statements:

Hello <replace name=customer_name>.<br>
Your phone number is <replace name=phone_number>.<br>
You are eligible for the following discounts: <replace name=discounts>.<br>
<replace name=specials >
<replace name=error>
<form action=http://someserver/computeTariff">
Enter the calling number: <input name=call_number value= <replace name=call_number>> <br>
Enter the time of this call: <input name=call_time value= <replace name=call_time>> <br>
Enter the date of this call: <input name=call_date value= <replace name=call_date>> <br>
Enter the duration of this call: <input name=call_length value=<replace name=call_length>> <br>
<input type=hidden name=session_key value=<replace name=session_key>>
<input type=hidden name=next_file value=answer.html, error.html>
<input type=submit>
</form> [3.4]

In the above document template excerpt [3.4], all the <replace ... >HTML tags are specialized. Thus, in step 332 all these specialized tags are rewritten using the contents of the customer's user specific area. Upon completion of step 332, the following HTML document is obtained:

Hello Mr. John Doe.<br>
Your phone number is 123 456 7890.<br>
You are eligible for the following discounts: Frequent Caller's Program.<br>
Note: This month, half price on all out-of-state calls! <br>
<form action=http://someserver/computeTariff>
Enter the calling number: <input name=call_number value=> <br>
Enter the time of this call: <input name=call_time value=> <br>
Enter the date of this call: <input name=call_date value=> <br>
Enter the duration of this call: <input name=call_length value=> <br>
<input type=hidden name=session_key value=1A3>
<input type=hidden name=next_file value=answer.html, getinfo.html>
<input type=submit>
</form> [3.5]

Note that since the names "error", "call_number", "call_time", "call_date" and "call_length" do not appear in the customer's user specific area, the corresponding specialized HTML tags have been replaced by the empty string.

Subsequently, when HTML form excerpt [3.5] is delivered to the customer's WWW browser, the customer sees a screen similar to that of FIG. 5.

At this point, assume the customer fills out all the requested information except the "Enter the duration of this call:" and then presses the submit button. A data transfer to the carrier's WWW server node is performed. This causes the WWW server "someserver" (e.g., network server 44) to execute the specialized CGI script identified as "computeTariff". Note that the server provides computeTariff with, for example, the following (name,value) pairs:

(call_number, 111 222 3333)
(call_time, 8:30 PM)
(call_date, September 21)
(session_key, 1A3)
(next_file, answer.html,getinfo.html) [3.6]

The computeTariff specialized CGI script searches this data, looking for a session identifier. Accordingly, it extracts the value of the name "session_key", that is to say, "1A3", then merges all the input data into the customer's user specific area identified by the session identifier, 1A3. Next, application specific logic 56 is executed by the computeTariff script for examining all the (name,value) pairs in the customer's user specific area. Assuming the application specific logic determines that there is no "call_duration" name in the customer's user specific area and therefore cannot process the "answer.html" HTML document template without this information, computeTariff may choose instead to process the getinfo.html document template after first merging the following (name,value) pair into the customer's user specific area:

(error, Error:<br>
You forgot to enter the duration of this call.
Please enter and resubmit.<br>) [3.7]

Consequently, the application specific logic 56 again processes the "getinfo.htmll" document template, and then transmits the following result to the customer's browser:

Hello Mr. John Doe. <br>
Your phone number is 123 456 7890. <br>
You are eligible for the following discounts: Frequent Caller's Program. <br>
Note: This month, half price on all out-of-state calls! <br>
Error: <br>
You forgot to enter the duration of this call.
Please enter and resubmit. <br>
<form action=http://someserver/computeTariff>
Enter the calling number: <input name=call_number value= 111 222 3333> <br>
Enter the time of this call: <input name=call_time value= 8:30 PM > <br>
Enter the date of this call: <input name=call_date value= September 21 > <br>
Enter the duration of this call: <input name=call_length value=> <br>
<input type=hidden name=session_key value=1A3>
<input type=hidden name=next_file value=answer.html, getinfo.html>
<input type=submit>
</form> [3.8]

Since the names "error", "call_number", "call_date" and "call-time" are now all present in the customer's user specific area, their values may serve to pre-populate graphical widgets in the resulting fill-out form. Thus, upon transfer to the customer's browser, the customer sees a document similar to FIG. 6.

Next, assuming the customer enters the duration of this call, and presses the submit button, the WWW server 44 "someserver" executes the specialized CGI script 48 identified as "computeTariff" once more. This time, the server provides the CGI script computeTariff with the following (name,value) pairs:

(call_number, 111 222 3333)
(call_time, 8:30 PM)
(call_date, September 21)
(call_length, 1 hr.)
(session_key, 1A3)
(next_file, answer.html,getInfo.html) [3.9]

Subsequently, the application specific logic 56 executed on the previous communication from this customer is again invoked (step 324). However, during this invocation the application determines that it has now received all the required user data, so it removes the "error" (name,value) pair of [3.7] from the customer's user specific area. The application specific logic 56 then consults the data base of long distance tariff rates and computes the tariff for this call, and writes the result into the customer's user specific area as the (name,value) pair:

(tariff, $5.00)

Next, a determination is made as to which document template to customize for the customer. Assume the answer.html document template is selected, which contains the following:

The tariff for calling <replace name=call_number> from
    <replace name=phone_number>
on <replace name=call_date> at <replace name=call_time> for <replace name=call_length>
is <br> <h2> <replace name=tariff>.</h2> [3.10]

At this point, the customer's user specific area contains the following (name,value) pairs:

Session 1A3:
(phone_number, 123 456 7890)
(PIN, 1234)
(session_key, 1A3)
(customer name, Mr. John Doe)
(discount, Frequent Caller's Program.)
(specials, Note: This month, half price on all out-of-state calls! <br>)
(call_number, 111 222 3333)
(call_time, 8:30 PM)
(call_date, September 21)
(call-length, 1 hr.)
(next_file, answer.html,getinfo.html)
(tariff, $5.00) [3.11]

Therefore, the display of the resulting HTML document transferred back to the customer will be similar to FIG. 7.

The dialog session now being completed once this last document transfer to the customer is performed, the CGI script 48 deletes the customer's user specific area from the user context data base 52.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with various modifications required by their particular application or uses of the invention. It is intended that the appended claims be construed to include alternative embodiments to the extent permitted by the prior art.

What is claimed is:

1. A method for communicating document related information between a server node and each of a plurality of client nodes residing on a communications network, comprising:

establishing a network communication connection between said server node and one client node of said plurality of client nodes;

communicating document related information between said server node and said one client node via said network communication connection;

automatically disconnecting said communication connection following said step of communicating;

wherein said steps of establishing, communicating and automatically disconnecting are conducted at least a first and second time, thereby providing a dialog session having a session identifier associated therewith, wherein for said first time at least steps (A1), (A3), (A4) and (A5) below are performed during said communicating step and for said second time, at least steps (A1) and (A2) below are performed during said communicating step;

(A1) transferring a set of one or more data items of said document related information from said one client node to said server node, each said data item providing access both to an identifier name and a value for said identifier name, wherein for at least said second time, said transferring step includes providing said session identifier to at least said server node;

(A2) updating, at said server node, a data collection related to said dialog session with data items obtained from said set of data items;

(A3) providing a template for transferring additional document related information from said server node to said one client node, said template having a replace portion related to a first identifier name included in a first data item of said updated data collection, said first data item providing access to said first identifier name and a first value for said first identifier name;

(A4) replacing said replace portion, in said template, with said first identifier value;

(A5) transmitting said template to said one client node.

2. A method, as claimed in claim 1, wherein at least one performance of said step of transmitting includes transmitting fill-out form related information in said template.

3. A method, as claimed in claim 1, wherein said step of communicating includes activating a World Wide Web browser.

4. A method, as claimed in claim 1, wherein said step of communicating includes utilizing a hypertext transfer protocol.

5. A method, as claimed in claim 1, wherein said one client node is unknown to said server node prior to said one client node performing said step of establishing a network communication connection with said server node.

6. A method, as claimed in claim 1, wherein said step of automatically disconnecting includes detecting a communication of a portion of said document related information from said server node to said client node in response to a communication of a different portion of said document related information from said client node to said server node.

7. A method, as claimed in claim 1, wherein said step of disconnecting is required by a protocol used in said step of communicating.

8. A method, as claimed in claim 1, wherein said step of replacing includes executing an instruction, in said replace portion, for replacing said first identifier name with one of: said first value and a value referenced by said instruction.

9. A method, as claimed in claim 1, wherein said step of updating includes merging said set of one or more data items with said data collection so that each data item of said data collection has a different identifier name.

10. A method, as claimed in claim 1, wherein each performance of said step of transferring further includes providing said session identifier to said client node.

11. A method, as claimed in claim 1, wherein said step of providing includes determining said template using said updated data collection.

12. A method, as claimed in claim 1, wherein said steps (A1) through (A5) are performed in each of a plurality of dialog sessions between said server node and other client nodes of said plurality of client nodes.

13. A method, as claimed in claim 1, wherein said document related information relates to services of a telephony provider.

14. A method, as claimed in claim 1, wherein said step of communicating includes using a protocol that retains no information of said first time after said step of automatically disconnecting for said first time occurs.

15. A method, as claimed in claim 1, wherein said steps (A1) through (A5) are included in a program template for constructing a document template processing program to execute on said server node during said step of communicating.

16. A method, as claimed in claim 1, wherein said step of communicating further includes a step of a user entering information into at least one fill-out form field on said one client node and requesting said document related information be sent to said server node, wherein said step of entering is performed before said step of transferring.

17. A method, as claimed in claim 1, wherein said step of communicating further includes a step of modifying said updated data collection by performing a program related to said dialog session.

18. An apparatus for processing document related information on a communications network using a network protocol wherein there are disconnects in communications between network nodes after a predetermined communication sequence between the network nodes, comprising:

network interface means on a first network node for sending and receiving document related information to and from a plurality of nodes on a communications network;

document template storage means for storing templates of documents, said document template storage means accessible by said first network node for retrieving said templates of documents;

context storage means for accumulating data items, related to said document related information, and received by said network interface means, said data items accumulated via a series of related communications between said first network node and a second network node, said related communications of said series using said network protocol, wherein said data items provide a context retained between said disconnects of network connections providing said related communications of said series, wherein each related communication of said series includes an identifier for identifying said related communication as included in said series;

means for selecting a responsive document template from said document template storage means, said responsive document template for responding to said document related information previously received by said network interface means, via one or more communications of said series;

means for converting said responsive document template into a responsive document to be sent to said second network node via said network interface means;

wherein at least one of: said related information received by said network interface means and said data items of said context of storage means is utilized by at least one of said means for selecting and said means for converting.

19. An apparatus, as claimed in claim 18, wherein said first node includes a World Wide Web server and said second node includes a World Wide Web client.

20. An apparatus, as claimed in claim 18, wherein said network protocol is a hypertext transfer protocol retaining no information of a previous network connection between said first and second network nodes after said network protocol has disconnected said previous network connection.

21. An apparatus, as claimed in claim 18, wherein said means for converting includes means for replacing, in said responsive document template, a replace instruction having an identifier name with a related value for said identifier name, said relationship between said identifier name and said value being included in a data item of said context storage means.

22. An apparatus, as claimed in claim 18, wherein said responsive document includes a fill-out form.

* * * * *